Dec. 22, 1925.
O. GLASS
RIM AND TIRE CLAMP
Filed Dec. 29, 1924
1,566,668
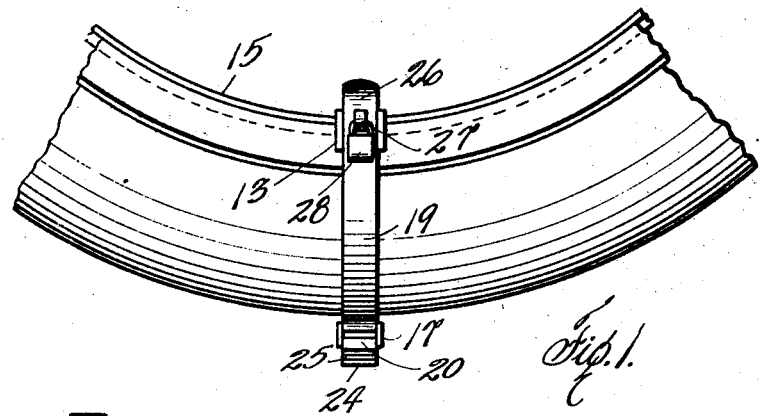
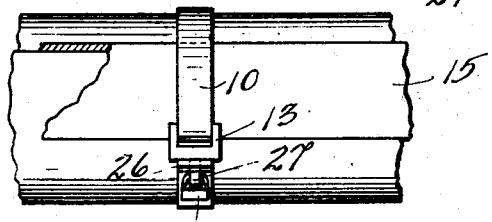
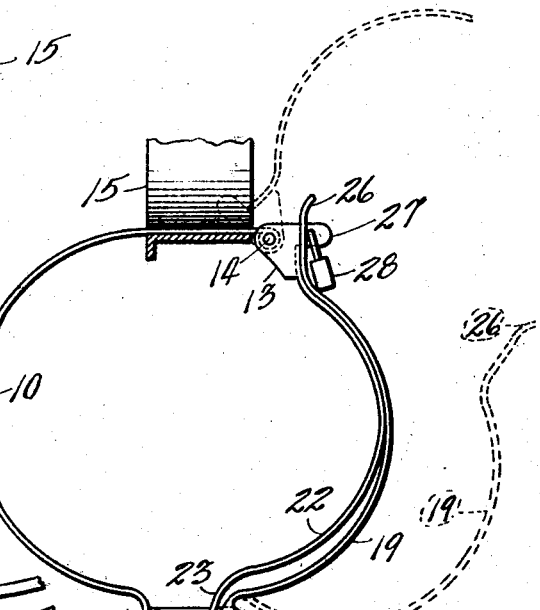
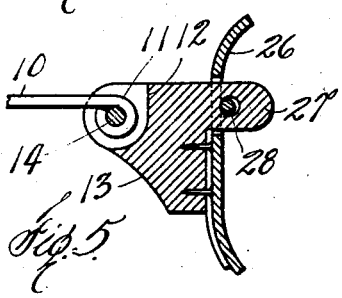
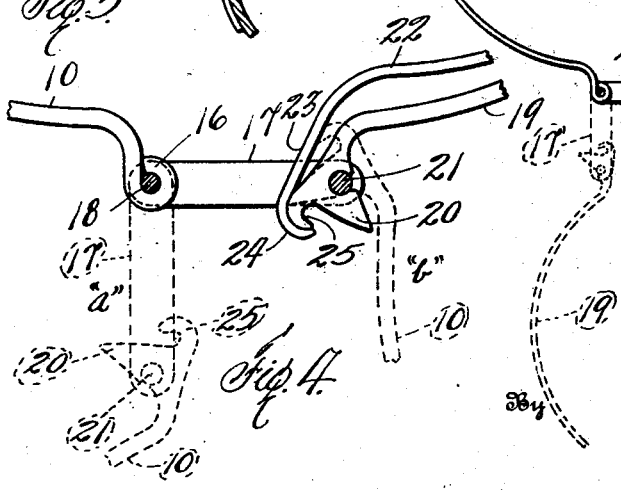
Inventor
Otto Glass
Attorney Patented Dec. 22, 1925.

1,566,668

UNITED STATES PATENT OFFICE.

OTTO GLASS, OF ROSEBUD, TEXAS.

RIM AND TIRE CLAMP.

Application filed December 29, 1924. Serial No. 758,552.

*To all whom it may concern:*

Be it known that I, OTTO GLASS, citizen of the United States of America, residing at Rosebud, in the county of Falls and State of Texas, have invented certain new and useful Improvements in Rim and Tire Clamps, of which the following is a specification.

This invention relates to new and useful improvements in rim and tire clamps.

The object of the invention is to provide means for readily and easily fastening a spare tire and rim on the bracket usually carried on the rear of many makes of automobiles.

A particular object of the invention is to provide a clamp device of a simple nature which will obviate the use of a plurality of nuts and bolts and fastening elements and which permits of operation without tools or the like.

Another object is to provide a clamp which will be substantial and to which a lock may be applied, thus eliminating the chain frequently used for securing the spare tire and rim against theft.

An important object is to provide certain improvements on the device shown in my Letters Patent No. 1,504,444, wherein the clamping is hinged to the upper end of the clamp to be swung upwardly and the locking lever is hinged to the lower end of the clamp, thus making for secure fastening and ease of operation.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of the lower portion of a spare tire and rim mounted on a supporting member and fastened in place with a clamp constructed in accordance with my invention, Fig. 2 is a partial plan of the same, Fig. 3 is an enlarged side elevation of the clamp, Fig. 4 is a detail of the lower bail connection, and Fig. 5 is an enlarged sectional view of the locking block and hasp.

In the drawings the numeral 10 designates an arcuate supporting member preferably formed of strap metal and either cast or bent into shape. At the upper forward end of the member is formed an eye or hinge roll 11 which is positioned in a recess 12 in a locking block 13 and pivoted upon a transverse pin 14.

The member 10 is fastened on the lower central portion of the usual tire bracket 15, which is found on the rear of many automobiles. At the lower end of the member 10 is formed an eye 16 which is disposed between the rear ends of hinge links 17 and pivoted thereto by a pin 18. A locking lever 19 has a fulcrum lug 20 at its lower end confined on a fulcrum pin 21 connecting the forward ends of the links 17.

A retaining arm 22 of spring steel has its upper end riveted or otherwise fastened to the face of the block 13. This arm is bowed outwardly and has a finger 23 on its lower end adapted to extend between the links 17. These links form a bail. This finger terminates in a knuckle-hook or lip 24. The lever 19 extends up the outside of the arm when the clamp is closed. The lug 20 is wedge shaped and is provided with an offset knuckle hook or boss 25. When the clamp is closed the parts stand in the position shown in full lines in Fig. 3. The upper end of the lever 19 has its upper end bent to form an upright hasp 26 which is slotted to receive an ear 27 extending from the block. A suitable padlock 28 may be engaged in the ear.

In using the clamp the lever 19 is swung downwardly so as to disengage from the parts 27 and 24. The arm 22 and block 13 may then be swung upwardly on the pin 14 as is shown in dotted lines in Fig. 3. This permits the tire and rim to be removed or a tire and rim to be placed on the rack 15.

After the tire and rim have been placed in position on the bracket 15 the arm 22 is swung down to the position shown in full lines in Fig. 4. The lever 19 is then grasped and the links 17 lifted so as to receive the finger 23 therebetween. The lever up to this point will not have been swung, being merely moved from the dotted line position "*a*" of Fig. 4 to the dotted line position "*b*" of Fig. 4. At this position the wedge point of the lug 20 will rest in the lip 24 and the boss 25 will rest against the finger 23. Now by swinging the lever 19 upwardly the point of the lug will ride down out of the lip and the boss 25 will ride thereunto as is shown in full lines in Fig. 4, thus fastening the clamp. When the lever is swung upwardly the hasp is engaged over the lug 27. The parts are firmly held against play.

Various changes in the size and shape of the different parts, as well as modifications and alterations may be made within the scope of the appended claims.

What I claim, is:

1. In a spare tire and rim clamp, an arcuate supporting member adapted to be secured at one end to a fixed part, an arcuate arm pivoted adjacent the secured end of said member, a locking lever pivoted at the free end of said member and extending substantially concentric to said arm, a fulcrum member carried by said lever to engage the free end of said arm, and means for securing the free end of said lever adjacent the pivot of said arm.

2. In a spare tire and rim clamp, a semicircular supporting member adapted to be secured at its upper end to an automobile, a block pivoted adjacent the upper end of said member, a semi-circular retaining arm secured to and depending from the block, a bail hinged to the lower end of the supporting member and straddling the lower end of said arm, and a lever pivoted on the bail to contact with said arm and extending concentric thereto to engage the block.

3. In a spare tire and rim clamp, a semicircular supporting member adapted to be secured at its upper end to an automobile, a block pivoted adjacent the upper end of said member, a semi-circular retaining arm secured to and depending from the block, a bail hinged to the lower end of the supporting member and straddling the lower end of said arm, a lever pivoted on the bail to contact with said arm and extending concentric thereto, and a hasp at the upper end of said lever engaging a projection from the block.

4. In a spare tire and rim clamp, a supporting member adapted to be secured at its upper end to an automobile, an arcuate arm pivoted at the secured portion of said member and extending downward, a knuckle hook at the lower end of the arm, a link pivoted at the lower end of the member, and an arcuate locking lever pivoted upon the link and extending concentric to the arm and having a knuckle hook engaging the hook of the arm when said lever is swung.

5. In a spare tire and rim clamp, an arcuate supporting member secured at its upper end to an automobile, an arcuate arm pivoted adjacent the secured end of said member and extending downward therefrom, a knuckle hook at the lower end of the arm, a link pivoted to the lower end of the member, a curved locking lever pivoted upon the link to extend concentric to the arm and having a fulcrum lug and also a knuckle-hook each adapted to engage with the knuckle-hook of the arm, and means for securing the locking lever adjacent the pivoted end of the arm.

In testimony whereof I affix my signature.

OTTO GLASS.